United States Patent
Pavlov

(10) Patent No.: US 8,203,999 B2
(45) Date of Patent: Jun. 19, 2012

(54) ROUTING IN SELFISH NETWORKS

(75) Inventor: Elan Pavlov, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 488 days.

(21) Appl. No.: 12/475,253

(22) Filed: May 29, 2009

(65) Prior Publication Data

US 2010/0304750 A1  Dec. 2, 2010

(51) Int. Cl.
*H04W 4/00* (2009.01)
(52) U.S. Cl. .......................... 370/328
(58) Field of Classification Search .......... 370/310–350; 455/422.1–465
See application file for complete search history.

(56) References Cited

U.S. PATENT DOCUMENTS

| | | | | |
|---|---|---|---|---|
| 2008/0037499 | A1* | 2/2008 | Kumar et al. | 370/342 |
| 2010/0124240 | A1* | 5/2010 | Lu et al. | 370/503 |

OTHER PUBLICATIONS

Naouel Salem et al., A Charging and Rewarding Scheme for Packet Forwarding in Multi-hop Cellular Networks, ACM Symposium on Mobile AdHoc Networking and Comluting, Jun. 1-3, 2003, Annapolis, Maryland, USA, Copyright 2003 ACM 1-58113-684-6/02/0006.
Kai Chen et al., Market Models and Pricing Mechanisms in a Multihop Wireless Hotspot Network, The Second Annual International Conference on Mobile and Ubiquitous Systems: Networking and Services, 2005. MobiQuitous 2005.
M. Jakobsson, J.P. Hubaux, and L. Buttydn, A Micro-Payment Scheme Encouraging Collaboration in Multi-hop Cellular Networks. In Proceedings of the Fourth Conference on Financial Cryptography (FC '03), Lecture Notes in Computer Science, pp. 15-33, Hamilton, Bermuda, 2003. International Financial Cryptography Association (IFCA), Springer-Verlag, Berlin Germany.
S. Zhong, J. Chen, and Y.R. Yang, Sprite: A Simple, Cheat-Proof, Credit Based System for Mobile Ad-Hoc Networks. In Proceedings of IEEE INFOCOM '03. Las Vegas, Jan. 2006.

\* cited by examiner

*Primary Examiner* — Hassan Kizou
*Assistant Examiner* — Charles C Jiang
(74) *Attorney, Agent, or Firm* — SoCal IP Law Group LLP; John E. Gunther; Steven C. Sereboff

(57) ABSTRACT

There is disclosed a method of operating a communications network having a plurality of selfish users. Each selfish user may send messages to a destination node with the messages being forwarded through intermediate nodes of a mesh network. Each selfish user may accumulate a debt equal to the power saved by having messages forwarded through other nodes in the mesh network less the power consumed forwarding messages for other nodes in the mesh network. Each selfish user having greater than zero accumulated debt may be required to forward messages for other nodes.

18 Claims, 5 Drawing Sheets

ROUTING IN SELFISH NETWORKS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to wireless communication networks.

2. Description of the Related Art

It is well known that a significant power saving can be achieved in a sensor network by having intermediate sensors act as routing points for messages when transferring data. Since sensor networks are controlled by a central authority with an objective of minimizing power consumption, that authority can ensure that intermediate sensors consume their energy for the good of the network. The primary advantage of having intermediate nodes forward messages is that the power consumption is a non-linear function of distance (depending on the network and type of communication it is assumed to be between squared and quadratic). Thus a series of communications over short distances or short hops requires less power than a single communication over the total distance.

These laws of physics govern other networks including cellular phones communicating with communication towers and peer-to-peer (P2P) networking via WiFi for laptops. However, the nodes on these networks are controlled by individuals, rather than by a central authority.

Within this description, the term "mesh network" will mean a communication network in which at least some nodes are capable of forwarding messages for other nodes. The determination of which nodes in a mesh network forward messages may be made dynamically depending on the location of the nodes and the network connectivity.

Within this description, the term "selfish user" will be used to describe a network node controlled by a party who wishes to optimize their own situation, rather than the well-being of the network. The term "altruistic user" will be used to describe a network node that will always forward messages. Mesh networks made up of selfish users, at least in part, will be called "selfish networks". A significant power consumption savings may also be achieved by using short hops to route messages among participants in selfish wireless networks such as cellular phone networks and WiFi networks.

There are also many other advantages to having users forward messages in a mesh network. Forwarding may allow messages to reach places that might not be served by central towers (or that can be designed not to be served by central towers based on forwarding). One example is the One Laptop Per Child project, which intends to extend coverage to a central server via forwarding. Another advantage of message forwarding is that it allows for a better reuse of frequency to serve more users with a smaller amount of bandwidth.

However, there are several practical objections to use of a mesh network when there are selfish users. The first objection concerns the perception that routing might compromise privacy. Since users feel that the forwarding entity has some special access to their data, they naturally feel that their privacy is threatened. The fear of privacy loss can be dealt with through the use of cryptography. By using the encryption modules in cellular phones or by adding encryption into peripheral devices (such as headphones) we can ensure that the problem of privacy does not appear as an ongoing threat to users.

Another problem that might arise when using forwarding through nodes controlled by individuals is the issue of reliability. This can be dealt with by demanding acknowledgments (possibly with a signature) to ensure that each message was received by its intended destination.

The main obstacle to the deployment of message forwarding protocols in wireless networks controlled by individuals is the reluctance of selfish users to give up some of their own power storage in order to contribute to the good of the network. A network that forwards messages incurs an "energy cost" for intermediate nodes in the message route. In effect, when one is not talking, one's battery is used for transporting messages for other network users. These energy costs might incentivize the owners of required intermediate nodes to refuse to forward messages, hence making it impossible to achieve an overall system-wide energy saving.

Prior work has concentrated on utilizing a system of micro-payments in order to motivate selfish users to participate in message forwarding on a network. Micro-payments are complicated for users to understand. Furthermore, existing schemes for micro-payments may require users to constantly adjust their willingness to forward based on constraints, such as when users intend to recharge their phones and how much talking they intend to do.

DETAILED DESCRIPTION

Throughout this description, the embodiments and examples shown should be considered as exemplars, rather than limitations on the apparatus and methods disclosed or claimed. Throughout this description, the method of receiving messages is ignored, since a communication device may receive messages without the increased energy consumption required to transmit messages, and since the power required to receive a message is, for the most part, independent of the distance the message traveled.

Description of Processes

Figure 1:
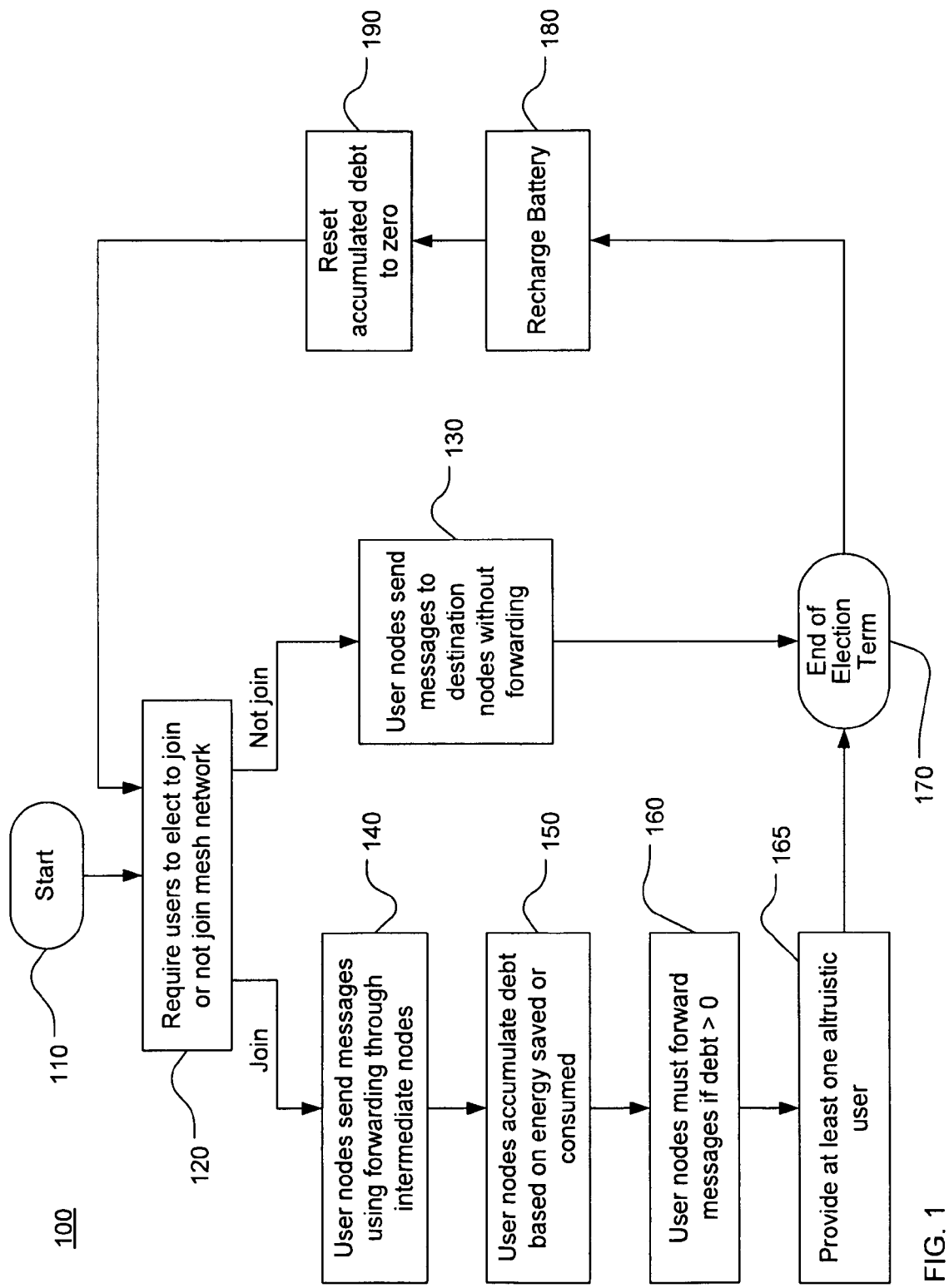
FIG. 1 is a flow chart of a method for operating a network.

Referring now to FIG. 1, a method 100 for operating a communication network starts at 110 when a user joins the communication network. Within this description, the term "user" means both a communication device and, where appropriate, a person controlling or operating the hardware device. At 120, the user is required to make an election to join or to not join a mesh network that forms a portion of the communication network.

Users who elect to not join the mesh network send messages to a destination node directly at 130, without the power-saving benefit of having the messages forwarded by intermediate nodes of the network. Within this description, a message includes any form of communication, which may be all or a portion of a telephone call or other data transfer. Messages may commonly be divided into data units, which include frames, cells, datagrams, packets or other units of information. Within this description, the term "destination node" means the network node that terminates the wireless portion of the message path, which may not be the ultimate destination of the message. The destination node may be, for example, a cellular tower, a wireless router, or another wireless communication device.

Users who elect to join the mesh network send messages to a destination node at 140, using forwarding through intermediate nodes when available to achieve power savings. At 150, each user accumulates a debt proportional to the energy saved by virtue of having messages forwarded through intermediate nodes, less the energy expended forwarding messages for other users. Two examples of the debt accumulation method are presented in FIG. 2 and FIG. 3.

Figure 2:
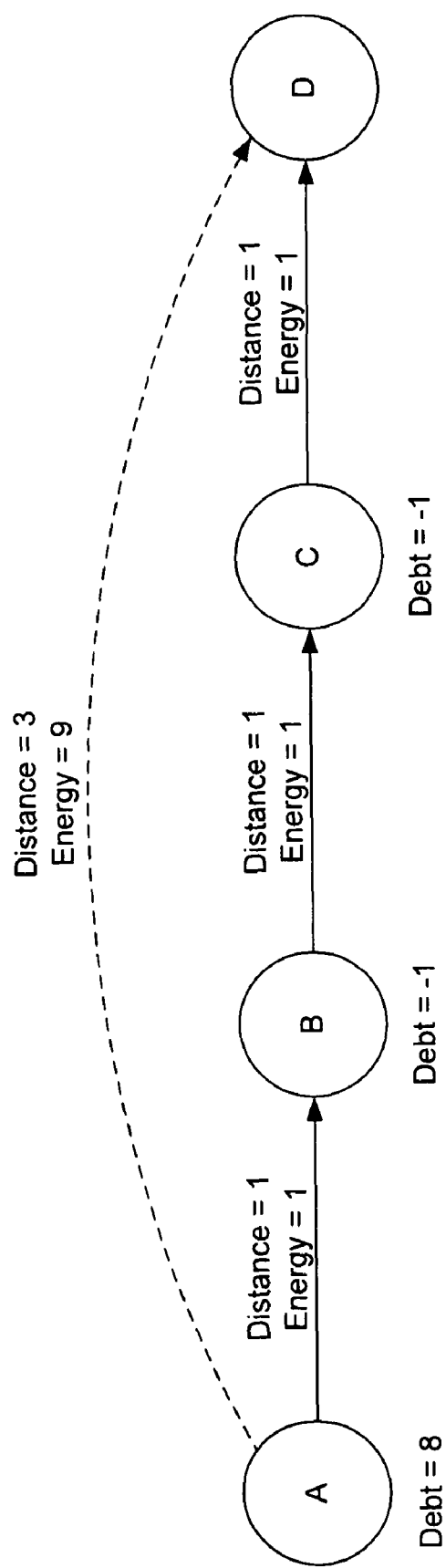
FIG. 2 is a diagram representing sending a message over a network.

In FIG. 2, user A may wish to send a message to user D over a distance of three units. Conservatively assuming that the energy required is proportional to the square of the distance, user A will need to expend nine units of energy to send the message directly to user D. In the real world, the energy required to transmit a message may be the distance raised to a power between 2.2 for open spaces and 4.0 for built-up urban areas. Note that the units used for distance in FIG. 2 are completely arbitrary, and that all messages are assumed to have durations of one arbitrary unit. Additionally, the units for energy are defined such that transmitting a message of one unit duration for one unit of distance requires one unit of energy.

If user A had previously elected to join the mesh network, user A may have the option of transmitting the message to user D via users B and C, who will forward the message. In this case, user A may only consume one unit of energy to transmit the message to user B, and both user B and user C may consume one unit of energy to forward the message. Thus user A saves 8 units of energy and accumulates 8 units of debt, while users B and C each consume one unit of energy and receive one unit of debt reduction, or credit, for forwarding the message for user A.

Figure 3:
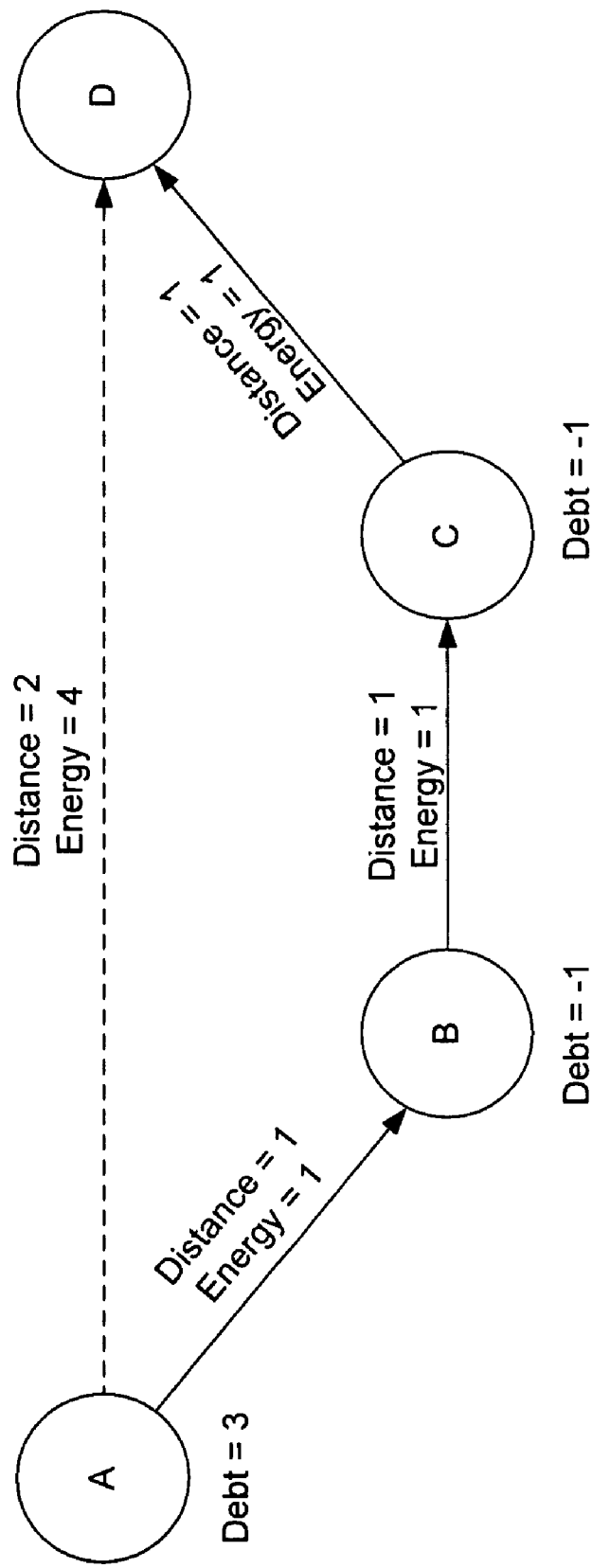
FIG. 3 is a diagram representing sending a message over a network.

The example of FIG. 3 is similar to that of FIG. 2, except that the distance between user A and user D is only two units. Thus the total route length for the message forwarded via users B and C (three hops of one unit length) is actually longer than the direct path from user A to user D. Nevertheless, forwarding the message saves energy. In this example, user A accumulates three units of debt, and users B and C each receive one unit of credit or debt reduction.

Returning to FIG. 1, each user that has elected to join the mesh network and that has accumulated a debt greater than zero may be required to forward messages for other users at 160. Since users are not required to forward messages if their debt is equal to zero, a user may never accumulate a negative debt level, which means that each user will never experience a net loss of stored energy (compared to the alternative of not joining the mesh network and placing an equivalent number of messages without forwarding). Since a user who elects to join the mesh network may gain and cannot lose (in terms of the number of messages sent for a given energy expenditure), electing to join the mesh network may be a dominant strategy selected by a large majority of users.

Since users are not required to forward messages for other users when their debt level is equal to zero, situations may arise where there are no users available to forward messages. For example, envision the initiation of a new network where the debt level of all users is simultaneously equal to zero. In this case, no users are obligated to forward messages until they accumulate debt, and no users can accumulate debt until some other user is willing to forward messages. Thus at least one altruistic user, who will always forward messages, may be provided at 165 to essentially "seed" the message forwarding process. Once message forwarding is initiated, the mesh network may evolve to a stable state where message forwarding is consistently available when requested. The altruistic user may be attached to the power grid and thus willing to incur a small energy cost without concern about depletion of a finite stored energy supply. The altruistic user may be a special cell phone tower or wireless router that is devoted to encouraging power savings.

The election to join or not to join the mesh network made at 120 may be for a finite or variable election term that may end at 170. When the election term ends at 170, the method for a specific user may cycle back to 120, where the user will again be required to make an election to join or not to join the mesh network. The election term may be a predetermined time period, or may be a variable time period determined by a defined event. The election term may not be the same for the plurality of users. For example, the election term may be the period between successive rechargings of a battery within the user device, and the election to join or not to join the mesh network may be required every time the battery is recharged at 180. To encourage participation in the mesh network, the user's debt may be reset to zero at 190 every time the battery is recharged.

Selfish users may attempt to abuse the method 100 of FIG. 1. For example, if allowed, an abusive user may elect to join the mesh network before transmitting a message and then immediately elect to withdraw from the mesh network without repaying the accumulated energy debt. To prevent such abuse, users may not be allowed to change their election to join or not to join the mesh network, or to withdraw from the mesh network, except at specific election times at the end of each election term.

Figure 4:
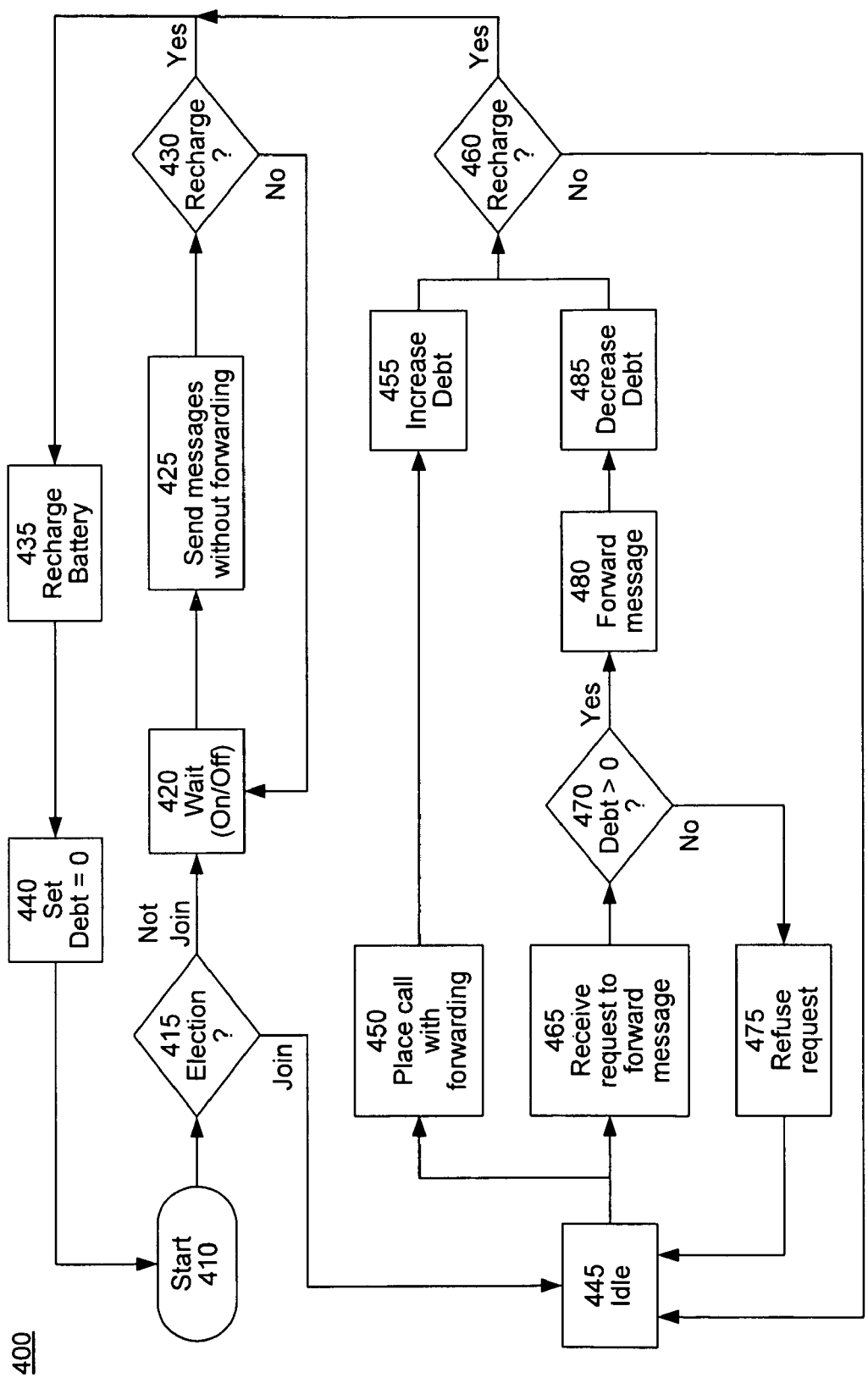
FIG. 4 is a flow chart of a method for operating a communications device.

FIG. 4 is a flow chart of a method 400 for operating a communication device that may be compatible with the method 100 of operating a communication network of FIG. 1. The method 400 begins at 410 where the communication device has a fully charged battery and zero accumulated energy debt. At 415, the communication device makes an election to join or not to join a mesh network. This election may be made automatically by the hardware and software comprising the communication device, or made be entered into the communication device by an operator.

In the case where the communication device elects to not join the mesh network, the process may wait at 420 until the device sends one or more messages at 425. The process may wait at 420 with the device power on or off. The messages sent at 425 may be sent directly to the destination node without the benefit of forwarding through intermediate nodes. The process may alternately wait at 420, send messages at 425, and receive messages (not shown) until the battery requires recharging at 430. When required, the battery may be recharged at 435 and the accumulated debt, if any, may be reset to zero at 440. The process then may return to the start at 410 and continue cyclically.

In the case where the communication device elects to join the mesh network, the process may wait in an idle state at 445 until the device sends one or more messages at 450 or until the device receives a request to forward a message at 465. The device power may not be completely off in the idle state at 445, since the device may be required to respond to requests to forward messages. A message sent at 450 may be routed to the destination node through one or more intermediate nodes that forward the message. Methods suitable for selecting routes through a mesh network are well-known and are not shown in FIG. 4. After sending each message, the energy debt of the device may be increased by an amount proportional to the power saved at 455.

Upon receiving a request to forward a message at 465, the device may evaluate its current energy debt level and refuse or ignore the request at 475 if the energy debt level is zero. If the energy debt level is greater than zero at the time the request is received, the device may forward the message at 480. The energy debt level may then be decreased at 485 by an amount proportional to the energy expended forwarding the message. The device may alternately wait at 445, send messages at 450, forward messages at 465, and receive messages (not shown) until the battery requires recharging at 460. When required, the battery may be recharged at 435 and the accumulated debt, if any, may be reset to zero at 440. The process then may return to the start at 410 and continue cyclically.

Description of Apparatus

Figure 5:
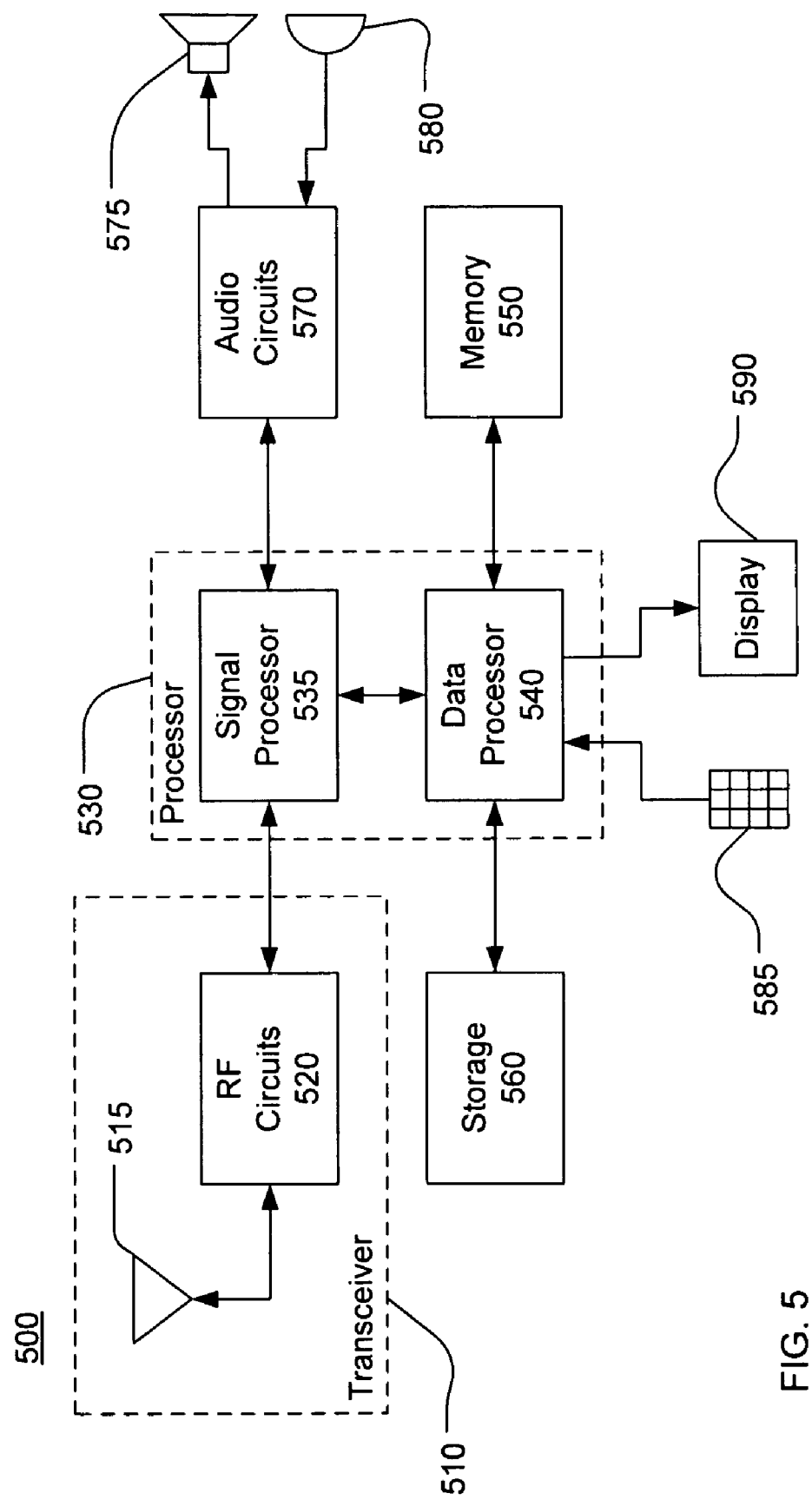
FIG. 5 is a block diagram of a communications device.

Referring now to FIG. 5, a communication device 500 may consist of a transceiver 510, a processor 530, memory 550, and storage 560. The communication device 500 may be suitable to execute the previously described method 400. The transceiver 510 may include an antenna 515 and RF circuits 520. The previously described method 400 may also be applied to free-space optical networks, in which case the antenna 515 may be replaced by a light source and a photodetector (both not shown).

The communication device 500 may include audio circuits 570, speaker 575, and microphone 580. The communication device 500 may also include operator input device 585 and display 590. The operator input device may include a keypad, keyboard, a mouse or other pointing device, and combinations thereof. The display 590 may be integrated into the communication device 500 or may be a separate unit coupled to communication device 500. The operator input device 585 and display 590 may be, at least in part, integrated such that touching the surface of the display 590 provides input to the communication device 500.

The communication device 500 may be a cellular phone, a personal digital assistant, an e-mail appliance, a 2-way pager, a laptop or notebook computer, or another communication device.

The processor 530 may be functionally divided into a signal processor 535 and a data processor 540. The signal processor 535 and a data processor 540 may be separate devices or may be contained, at least in part, in a common integrated circuit or package. The signal processor 535 and a data processor 540 may share access to memory 550, which may be used for temporary storage of messages and other data.

The processor 530 may include software and/or hardware for providing functionality and features described herein. The processor 530 include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The processor may include various specialized units, circuits, software and interfaces for providing the functionality and features described here. The processes, functionality and features may be embodied in whole or in part in software which operates on processor 530 and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the processor 530 and others by other devices. Additional and fewer units, modules or other arrangement of software, hardware and data structures may be used to achieve the processes and apparatuses described herein.

As used herein, a storage device is a device that allows for reading and/or writing to a storage medium. Storage devices suitable for storage device 560 may include hard disk drives, DVD drives, flash memory devices, and others. The storage device 560 may include a storage media containing instruction that, when executed by the processor 530, cause the communication device to perform the described functions and processes. These storage media include, for example, magnetic media such as hard disks, floppy disks and tape; optical media such as compact disks (CD-ROM and CD-RW) and digital versatile disks (DVD and DVD±RW); flash memory cards; and other storage media. The storage media may be a Subscriber Identity Module (SIM) card, a Universal Integrated Circuit Card (UICC), a Removable User Identity Module (RUIM), or other storage device.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method of operating a communications network having a plurality of nodes, at least some of the nodes being selfish users, the method comprising:

requiring each of the selfish users to make an election to join or to not join a mesh network at predetermined election times at least one selfish user sending messages that are forwarded through other nodes in the mesh network, wherein the selfish user saves power relative to sending messages without forwarding;

the at least one selfish user consuming power forwarding messages for other nodes in the mesh network; and the at least one selfish user accumulating a debt equal to the power saved by having messages forwarded less the power consumed forwarding messages, wherein the at least one selfish user is required to forward messages for other nodes if the accumulated debt is greater than zero, and wherein the at least one selfish user comprises a device including a battery and the predetermined election times are every time the battery is fully charged.

2. The method of operating a communications network of claim 1, further comprising providing at least one altruistic user that will always forward messages in the mesh network.

3. A method of operating a communications network having a plurality of nodes, at least some of the nodes being selfish users, the method comprising:

requiring each of the selfish users to make an election to join or to not join a mesh network at predetermined election times at least one selfish user sending messages that are forwarded through other nodes in the mesh network, wherein the selfish user saves power relative to sending messages without forwarding;

the at least one selfish user consuming power forwarding messages for other nodes in the mesh network; and the at least one selfish user accumulating a debt equal to the power saved by having messages forwarded less the power consumed forwarding messages, wherein the at least one selfish user is required to forward messages for other nodes if the accumulated debt is greater than zero, and wherein each selfish user may not change their election except at the predetermined election times.

4. The method of operating a communications network of claim 3, further comprising providing at least one altruistic user that will always forward messages in the mesh network.

5. A method of operating a communications network having a plurality of nodes, at least some of the nodes being selfish users, the method comprising:

requiring each of the selfish users to make an election to join or to not join a mesh network at predetermined election times at least one selfish user sending messages that are forwarded through other nodes in the mesh network, wherein the selfish user saves power relative to sending messages without forwarding;

the at least one selfish user consuming power forwarding messages for other nodes in the mesh network; and the at least one selfish user accumulating a debt equal to the power saved by having messages forwarded less the power consumed forwarding messages, wherein the at least one selfish user is required to forward messages for other nodes if the accumulated debt is greater than zero, and wherein each selfish user, having made an election to become a user node in the mesh network, may not withdraw from the mesh network except at the predetermined election times.

6. The method of operating a communications network of claim 5, further comprising providing at least one altruistic user that will always forward messages in the mesh network.

7. A method of operating a communications network having a plurality of nodes, at least some of the nodes being selfish users, the method comprising:

requiring each of the selfish users to make an election to join or to not join a mesh network at predetermined election times at least one selfish user sending messages that are forwarded through other nodes in the mesh network, wherein the selfish user saves power relative to sending messages without forwarding;

the at least one selfish user consuming power forwarding messages for other nodes in the mesh network; and the at least one selfish user accumulating a debt equal to the power saved by having messages forwarded less the power consumed forwarding messages, wherein the at least one selfish user is required to forward messages for other nodes if the accumulated debt is greater than zero, and wherein each selfish user's accumulated debt is reset to zero every time the selfish user makes the election whether or not to join the mesh network.

8. The method of operating a communications network of claim 7, further comprising providing at least one altruistic user that will always forward messages in the mesh network.

9. A method of operating a communications device, the method comprising:

electing to join or to not join a mesh network at predetermined election times;

if the election is made to join the mesh network;

saving power by having messages forwarded through other nodes in a mesh network and consuming power forwarding messages for other nodes in the mesh network;

accumulating a debt equal to the power saved by having messages forwarded less the power consumed forwarding messages; and forwarding messages from other nodes if the accumulated debt is greater than zero, wherein electing to join or to not join the mesh network at predetermined election times further comprises electing to join or to not join the mesh network every time a battery within the communication device is fully charged.

10. A method of operating a communications device, the method comprising:

electing to join or to not join a mesh network at predetermined election times;

if the election is made to join the mesh network;

saving power by having messages forwarded through other nodes in a mesh network and consuming power forwarding messages for other nodes in the mesh network;

accumulating a debt equal to the power saved by having messages forwarded less the power consumed forwarding messages; and forwarding messages from other nodes if the accumulated debt is greater than zero, wherein the communication device may not change an election except at the predetermined election times.

11. A method of operating a communications device, the method comprising:

electing to join or to not join a mesh network at predetermined election times;

if the election is made to join the mesh network;

saving power by having messages forwarded through other nodes in a mesh network and consuming power forwarding messages for other nodes in the mesh network;

accumulating a debt equal to the power saved by having messages forwarded less the power consumed forwarding messages; and forwarding messages from other nodes if the accumulated debt is greater than zero, wherein the communication device, having made an election to join the mesh network, may not withdraw from the mesh network except at the predetermined election times.

12. A method of operating a communications device, the method comprising:

electing to join or to not join a mesh network at predetermined election times;

if the election is made to join the mesh network;

saving power by having messages forwarded through other nodes in a mesh network and consuming power forwarding messages for other nodes in the mesh network;

accumulating a debt equal to the power saved by having messages forwarded less the power consumed forwarding messages;

forwarding messages from other nodes if the accumulated debt is greater than zero; and setting the debt to zero every time the communication device elects to join or not to join the mesh network.

13. A portable communications device, comprising:

a transceiver to send and receive messages from other communications devices;

a processor coupled to the transceiver; and a storage medium having instructions stored thereon which, when executed by the processor, cause the communications device to perform actions comprising:

electing, at predetermined election times, to join or to not join a mesh network;

if the election is made to join the mesh network:

saving power by sending messages to a destination node using forwarding through intermediate nodes in the mesh network and consuming power forwarding other nodes in the mesh network;

accumulating a debt equal to the power saved by having messages forwarded less the power consumed forwarding messages; and forwarding messages for other nodes if the accumulated debt is greater than zero, wherein electing to join or to not join the mesh network further comprises electing to join or to not join the mesh network every time a battery within the communication device is fully charged.

14. The portable communications device of claim 13, further comprising:

a user input device; and a display device;

wherein electing to join or to not join a mesh network comprises:

requesting, by means of the display device, a user to make an election to join or not to join the mesh network, and receiving, by means of the user input device, an election from the user.

15. A portable communications device, comprising:

a transceiver to send and receive messages from other communications devices;

a processor coupled to the transceiver; and a storage medium having instructions stored thereon which, when executed by the processor, cause the communications device to perform actions comprising:

electing, at predetermined election times, to join or to not join a mesh network;

if the election is made to join the mesh network:

saving power by sending messages to a destination node using forwarding through intermediate nodes in the mesh network and consuming power forwarding messages for other nodes in the mesh network;

accumulating a debt equal to the power saved by having messages forwarded less the power consumed forwarding messages; and forwarding messages for other nodes if the accumulated debt is greater than zero, wherein the election to join or not join the mesh network may not change except at the predetermined election times.

16. The portable communications device of claim 15, further comprising:

a user input device; and a display device;

wherein electing to join or to not join a mesh network comprises:

requesting, by means of the display device, a user to make an election to join or not to join the mesh network, and receiving, by means of the user input device, an election from the user.

17. A portable communications device, comprising:

a transceiver to send and receive messages from other communications devices;

a processor coupled to the transceiver; and a storage medium having instructions stored thereon which, when executed by the processor, cause the communications device to perform actions comprising:

electing, at predetermined election times, to join or to not join a mesh network;

if the election is made to join the mesh network:

saving power by sending messages to a destination node using forwarding through intermediate nodes in the mesh network and consuming power forwarding messages for other nodes in the mesh network;

accumulating a debt equal to the power saved by having messages forwarded less the power consumed forwarding messages;

forwarding messages for other nodes if the accumulated debt is greater than zero, and setting the debt to zero every time the communication device elects to join or not to join the mesh network.

18. The portable communications device of claim 14, further comprising:

a user input device; and a display device;

wherein electing to join or to not join a mesh network comprises:

requesting, by means of the display device, a user to make an election to join or not to join the mesh network, and receiving, by means of the user input device, an election from the user.

* * * * *